Aug. 17, 1926.
L. OKRAINETZ
1,596,854
DISHWASHING MACHINE
Filed March 3, 1925
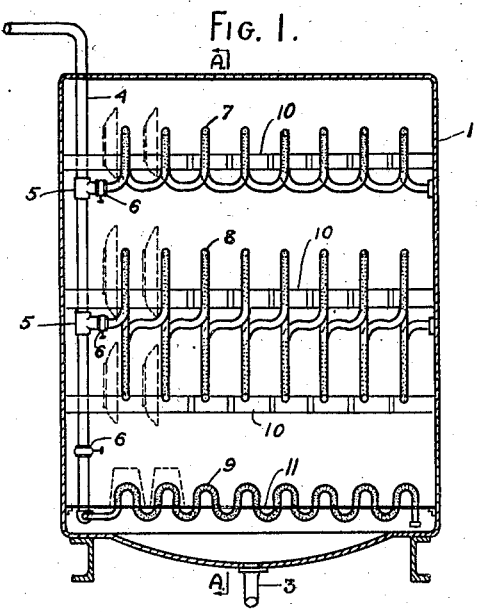
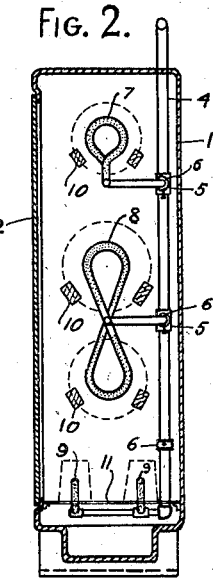
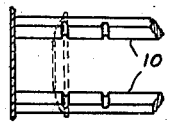
Witnesses:
Leo Buff
R. V. Pisnan
INVENTOR
Leizor Okrainetz Patented Aug. 17, 1926.

1,596,854

UNITED STATES PATENT OFFICE.

LEIZOR OKRAINETZ, OF NEW YORK, N. Y.

DISHWASHING MACHINE.

Application filed March 3, 1925. Serial No. 12,983.

It is the purpose of this invention to provide a dish-washer which is simple, efficient and practical in construction. The other objects of the invention will be more fully set forth in the following description.

Referring to the accompanying drawings:—

Fig. 1 is a vertical sectional view of a dish-washer embodying my invention.

Fig. 2 is a sectional view on line A—A of Fig. 1.

Fig. 3 shows details of the shelves.

This improved dish-washer comprises a suitable casing 1, which is provided with a door 2, and drain-outlet 3.

I equip the casing 1, inside or outside with an inlet-pipe 4, which can be connected with the hot and cold water supply and is provided with branches 5, and valves 6.

To the valves 6, are connected perforated spiral spray pipes 7, 8, and zig-zag spray pipes 9 which are supported within the casing 1, in such manner that they wind between the dishes to be washed.

The casing 1, is also provided with a series of shelves 10, to hold the dishes.

As appropriate means for holding cups, glasses, also spoons, knives and forks, I provide the casing 1, with a shelf 11, made preferably of wire screen.

It is to be understood that the dish-washer may be of any size and all the parts constructed of any suitable material.

Also it is to be noted that the spiral and zig-zag pipes to be used may be of any number, cross-section and shape of winding and made of metal, rubber or any other material.

When the dishes to be washed are mounted on the shelves within the casing 1, and the water supply opened the streams of the cleansing liquid, passing through the perforated spiral, and zig-zag spray pipes, 7, 8, 9, are directed from both sides against the dishes, thus thoroughly cleansing the same.

The exterior portions of the cups and glasses, also the spoons, knives, and forks, disposed on the lower shelf will be cleansed by the water in its descent from the uppermost shelves.

The water supply to each pipe 7, 8, 9 can be separately regulated by means of the valves 6.

After the dishes have been thoroughly washed the supply of water may be cut off and the dishes may be allowed to remain in the dish-washer until they are dry.

Having described my invention I claim:—

1. In a dish washing machine, a cabinet, a water supply pipe extending vertically in said cabinet adjacent the inner face of one of the end walls thereof, a plurality of dish supporting racks extending through said cabinet, there being a rack at the top of the cabinet, a rack at the bottom of the cabinet, and two racks intermediate the upper and lower racks, a coiled spray pipe branching off from said water supply pipe and extending throughout the length of the upper dish supporting rack, and a single centrally disposed spray pipe leading from said water supply pipe at a point between said intermediate dish supporting racks, said last mentioned spray pipe having a series of upstanding convolutions extending to a point adjacent the upper of said intermediate dish supporting racks and a plurality of depending convolutions extending to a point adjacent the lower of said intermediate dish supporting racks.

2. In a dishwashing machine, a cabinet, a water supply pipe extending vertically in said cabinet adjacent one of the end walls thereof, a plurality of dish supporting racks extending through said cabinet, a coiled spray pipe branching off from said water supply pipe and extending throughout the length of one of the dish supporting racks, a single, centrally disposed spray pipe leading from said water supply pipe at a point between the intermediate dish supporting racks, said last mentioned spray pipe having a series of upstanding convolutions extending to a point adjacent of the upper of said intermediate dish supporting racks, and a plurality of depending convolutions extending to a point adjacent the lower of said intermediate dish supporting racks.

3. In a dishwashing machine, a casing, dish supporting racks mounted in said casing, dish holding means on said racks for holding the dishes in spaced relation longitudinally thereof, spiral spray pipes extending throughout the length of said dish supporting racks and having convolutions vertically disposed with respect thereto, said convolutions extending between the dish holding means, and a supply pipe common to said spray pipes for supplying a cleaning fluid thereto.

In testimony whereof I have signed this specification.

LEIZOR OKRAINETZ.